Nov. 15, 1927.
W. A. JOHNSON
COUPLING FOR ARMORED HOSE
Filed Jan. 2, 1923
1,649,594
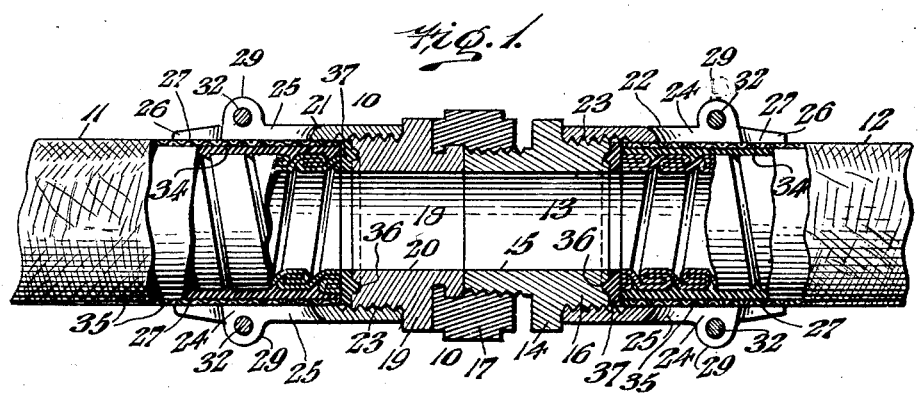
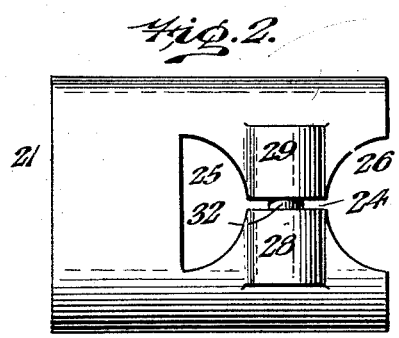
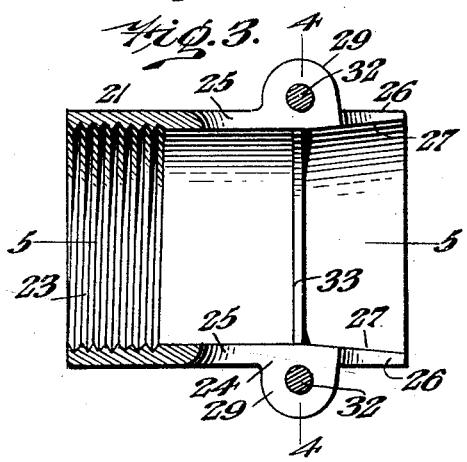
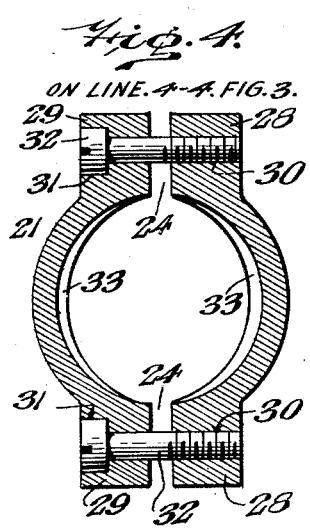
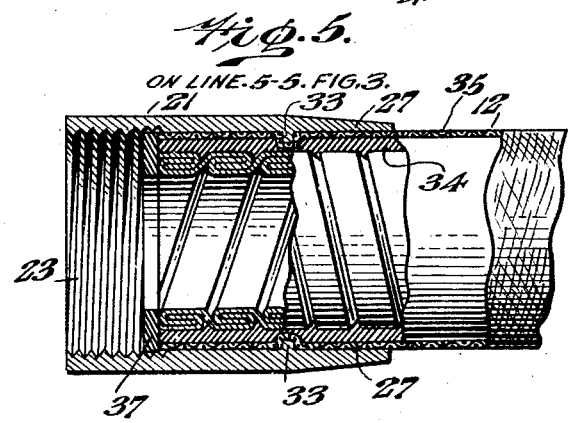
INVENTOR
William A. Johnson.
BY
Robert M. Barr.
ATTORNEY Patented Nov. 15, 1927.

1,649,594

UNITED STATES PATENT OFFICE.

WILLIAM A. JOHNSON, OF CHICAGO, ILLINOIS, ASSIGNOR TO PENNSYLVANIA FLEXIBLE METALLIC TUBING COMPANY, OF PHILADELPHIA, PENNSYLVANIA, A CORPORATION OF PENNSYLVANIA.

COUPLING FOR ARMORED HOSE.

Application filed January 2, 1923. Serial No. 610,238.

Some of the objects of the present invention are to provide an improved mechanism for coupling the ends of metallic or other armored hose to form a continuous hose which is separable at will at the coupling point; to provide a simple and effective coupling device for quickly repairing split or otherwise damaged hose; to provide a device for attaching a coupling to the end of a metallic or other armored hose in a fixed leak-proof manner; to provide means for attaching a coupling to an end of a hose in a manner to prevent relative movement between the parts, either axially or circumferentially; to provide an improved clamping mechanism for armored hose; and to provide other improvements as will hereinafter appear.

In the accompanying drawings, Fig. 1 represents a longitudinal section of a coupling for hose embodying one form of the present invention; Fig. 2 represents a side elevation of one of the coupling attaching devices; Fig. 3 represents an axial section of the same; Fig. 4 represents a section on line 4—4 of Fig. 3; and Fig. 5 represents a section on line 5—5 of Fig. 3 showing the clamping element attached to an end of an armored flexible hose.

Referring to the drawings, one form of the present invention comprises a coupling 10 arranged to be removably attached to the meeting ends of two sections or lengths of flexible metallic or armored hose, which is formed in the usual manner of a plurality of interfitting convolutions of flexible metallic tubing 11 encased in a covering 12 of suitable material. In the present construction the coupling 10 consists generally of means for connecting the two ends of the hose together, and means for removably attaching the respective connecting means to the hose.

For the purpose of connecting the meeting ends of two lengths of hose, a type of union is employed which comprises a head 13 formed intermediate its length with a hexagon-shaped flange 14 and oppositely disposed tubular, exteriorly threaded end portions 15 and 16. The threaded end portion 15 is arranged to be engaged by a nut 17, which is swivelled in the usual manner upon the tubular union body 18, so that the two parts can be tightly drawn together to form a leakproof joint as will be readily understood. The body 18 is formed with a hexagon-shaped flange 19 and a threaded end portion 20 on the opposite part of the body from the nut 17. The flanges 14 and 19 serve to receive a wrench or other implement whereby the two parts are held or manipulated while being connected.

As a means for attaching the respective parts of the union to the metallic hose, two sleeve clamps 21 and 22 are employed, each of which has an internally threaded end portion 23, in one instance for threaded engagement with the end portion 16 of the head 13, and in the other instance for threaded engagement with the end portion 20 of the body 18. As these two clamping elements 21 and 22 are of like construction, the present description will be confined to one, and like reference numerals applied to corresponding parts of the other. Thus taking the sleeve clamp 21, it has an internal diameter sufficient to snugly receive the hose to which it is to be attached, and has its outer or unthreaded end split at two opposite portions 24, the material so removed being of a thickness to provide enough clearance to permit the two end parts of the sleeve to move towards each other to reduce the diameter sufficiently for rigid clamping purposes.

In order to render the sleeve more readily responsive to the flexing action necessary for proper clamping, openings 25 are cut in the respective sides of the sleeve adjacent to and communicating with the split portions on the inner ends thereof, while recesses 26 form a continuation of the respective split portions at the other ends thereof and these recesses enlarge respectively to the end of the sleeve. In addition the inner diameter of the sleeve, from a point approximately opposite the split portions, is outwardly tapered, as shown at 27, to the hose receiving end of the sleeve. The foregoing construction gives the desired clamping movement without weakening the walls or otherwise impairing the proper functioning of the sleeve.

For the purpose of producing the desired clamping action, the opposed walls of each split portion of the sleeve are formed with juxtaposed lugs 28 and 29, each such pair of lugs having a threaded hole 30 in one lug 28 and a counterbored hole 31 in the other lug 29, such holes being alined to receive a clamping screw 32. By tightening the screws 32 the split end portions of the sleeve are drawn together to reduce the inner diameter and thus rigidly bind the sleeve upon the hose.

To prevent movement axially between the sleeve and the hose, the inner circumference of the sleeve is provided with one or more ribs 33, the depth and width of which conform approximately to the same dimensions as the space formed between the helical convolutions of the metallic tubing. As here shown the sleeves 21 and 22 are each provided with two such ribs arranged at opposite side portions of the inner circumference thereof, and preferably these ribs taper towards their ends where they merge into the inner wall of the sleeve. Thus when a sleeve is assembled upon its hose end, the rib or ribs 33 thereon are forced into interlocking relation with the hose by compressing the covering 12 into the space between the convolutions of the metal armor 11.

In the present construction the flexible metallic armor 11 is covered with a fabric 12 comprising an inner casing 34 of rubber and an outer casing 35 of woven fabric, such being the general type of coverings in use at the present time for hose of this character. It is to be understood, however, that this construction is only shown by way of example and that the coupling of the present invention is applicable to various forms of hose for uniting sections thereof.

As a means for forming a leak-proof joint between the end of the hose and the interfitting part of the union, either part 13 or part 18, each of these parts is provided with a groove 36 in the face abutting the hose for the purpose of forming a pocket to receive a washer 37, when the latter is placed under compression by the clamping action of the coupling.

In attaching the respective parts of the coupling, the two sleeves 21 and 22 are respectively clamped to the ends of the two lengths of hose. This is accomplished by inserting the hose into the sleeve until the end abuts the thread 23, whereupon the screws 32 are tightened. This causes the split end portions of the sleeve to be drawn towards each other to force the ribs 33 against the covering 12 and compress a circumferential section of the fabric into the space between two convolutions of the metal armor. Thus the sleeve is not only clamped rigidly against relative turning movement but is likewise held against movement axially of the hose. The washer 37 for that end is then placed in the sleeve to abut the end of the hose, and the co-operating part of the union, say 13, is screwed into the sleeve and forcibly actuated to compress the washer 37 between the opposed ends of the part 13 and the hose and into the face groove 36 to thereby form a leak-proof joint.

From the foregoing it will be apparent that a complete unitary attachment for coupling armored flexible hose, of the kind employed for conducting liquids such for example as flexible hose for gasoline pumps or any other purpose, has been devised, and that it is simple and effective and provides a leak-proof construction. Generally hose of this character is subjected to severe strains at the points where it is connected to a rigid part and in consequence splits or breaks at such a junction point. When this happens it is the usual practice to send the broken or damaged hose to a repair place to have a new coupling or other rigid attachment applied, and therefore the particular device with which the hose was used is temporarily put out of commission. By the present invention such delays and expense of repairs are eliminated because the most unskilled workmen can quickly remove the two attaching sleeves, or only one if necessary, by merely loosening the screws 32, and then cutting off the damaged part of the hose, after which the sleeves can be put upon the new ends and the hose is again ready for use. While the present showing discloses the attaching means as used with a coupling for two ends of hose, it will be understood that but one sleeve can be used if desired to form a connection for a nozzle or any other part to be connected to one end of a length of hose.

Having now fully described my invention, what I claim is:—

1. A coupling comprising a sleeve arranged to receive an end of a length of armored hose formed of spiral convolutions and having a flexible covering, said sleeve having a split portion at one end, means at the other end of said sleeve for attaching said sleeve to a cooperating part, clamping means for drawing the split portions together to grip said hose, and an internal rib on said split portions and integral therewith forced by said clamping means into said hose transverse to said convolutions to interlock said sleeve and said hose.

2. A coupling comprising a sleeve arranged to receive an end of a length of flexible armored hose having a flexible cover, means at one end of said sleeve for attaching said sleeve to a co-operating part, clamping means at the other end of said sleeve for causing said sleeve to grip said hose, and a rib formed on the inner circumference of said sleeve all points of said rib lying in the same transverse plane, said rib being arranged to be forced across convolutions of said hose in binding engagement with said cover to prevent axial relative movement.

3. A hose coupling comprising a split sleeve internally threaded at its coupling end and clamped to the terminal end of an interiorly armored hose and extending therebeyond, a coupling sleeve exteriorly threaded to engage the threads of the split sleeve so as to provide a space between the adjacent ends of said coupling sleeve and armored hose, and a gasket in said space abutting the said adjacent ends and which is adapted to be compressed by the engagement of the coupling and split sleeves.

Signed at Chicago, county of Cook, State of Illinois, this 26 day of December, 1922.

WILLIAM A. JOHNSON.